(12) United States Patent
North et al.

(10) Patent No.: US 10,571,981 B2
(45) Date of Patent: Feb. 25, 2020

(54) SYSTEM AND METHOD OF TRANSFERRING ENERGY IN INFORMATION HANDLING SYSTEM

(71) Applicant: Dell Products L.P., Round Rock, TX (US)

(72) Inventors: Travis Christian North, Cedar Park, TX (US); Mitchell Anthony Markow, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 17 days.

(21) Appl. No.: 15/948,181

(22) Filed: Apr. 9, 2018

(65) Prior Publication Data

US 2019/0310695 A1   Oct. 10, 2019

(51) Int. Cl.
    *G06F 1/20*     (2006.01)
    *G05D 23/19*    (2006.01)
    *G06F 1/26*     (2006.01)

(52) U.S. Cl.
    CPC ......... *G06F 1/206* (2013.01); *G05D 23/1917* (2013.01); *G06F 1/26* (2013.01)

(58) Field of Classification Search
    None
    See application file for complete search history.

(56) References Cited

U.S. PATENT DOCUMENTS

| | | | |
|---|---|---|---|
| 2013/0321041 A1* | 12/2013 | Kim | H03K 3/011 327/113 |
| 2013/0322012 A1* | 12/2013 | Dunwoody | G06F 1/20 361/679.53 |
| 2017/0220083 A1* | 8/2017 | Helberg | G06F 1/206 |

* cited by examiner

*Primary Examiner* — Ryan A Jarrett
(74) *Attorney, Agent, or Firm* — Baker Botts L.L.P.

(57) ABSTRACT

In one or more embodiments, one or more systems, methods, and/or processes may determine temperatures of respective components, of an information handling system, housed in a duct of the information handling system and vertically positioned within the duct; may determine that a first temperature of the temperatures associated with a respective first component of the components meets a temperature threshold; may determine that a second component of the components is vertically positioned above the first component; may determine, based at least on a second temperature of the temperatures, associated with the second component, that the second temperature can be increased; and may provide, to the second component, information that causes the second temperature of the second component to increase, causing air to flow from a first end of the duct to a second end of the duct.

20 Claims, 11 Drawing Sheets

SYSTEM AND METHOD OF TRANSFERRING ENERGY IN INFORMATION HANDLING SYSTEM

BACKGROUND

Field of the Disclosure

This disclosure relates generally to information handling systems and more particularly to transferring energy in information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine temperatures of respective components, of an information handling system, housed in a duct of the information handling system and vertically positioned within the duct; may determine that a first temperature of the temperatures associated with a respective first component of the components meets a temperature threshold; may determine that a second component of the components is vertically positioned above the first component; may determine, based at least on a second temperature of the temperatures, associated with the second component, that the second temperature can be increased; and may provide, to the second component, first information that causes the second temperature of the second component to increase, causing air to flow from a first end of the duct to a second end of the duct. For example, the second component may be or include a graphical processing unit. For instance, the first information that causes the second temperature of the second component to increase may include graphical processing unit instructions that are executable the graphical processing unit. In one or more embodiments, the components may be coupled to a board, of the information handling system, that vertically positions the components within the duct and communicatively couples at least two of the components. In one or more embodiments, the duct may have a first vent at or near the first end of the duct and may have a second vent at or near the second end of the duct. In one or more embodiments, the duct may include a shape of a rectangular prism, a polygonal prism, or a cylinder. In one or more embodiments, one or more systems, methods, and/or processes may further provide second information to the first component that causes the first temperature of the first component to decrease.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
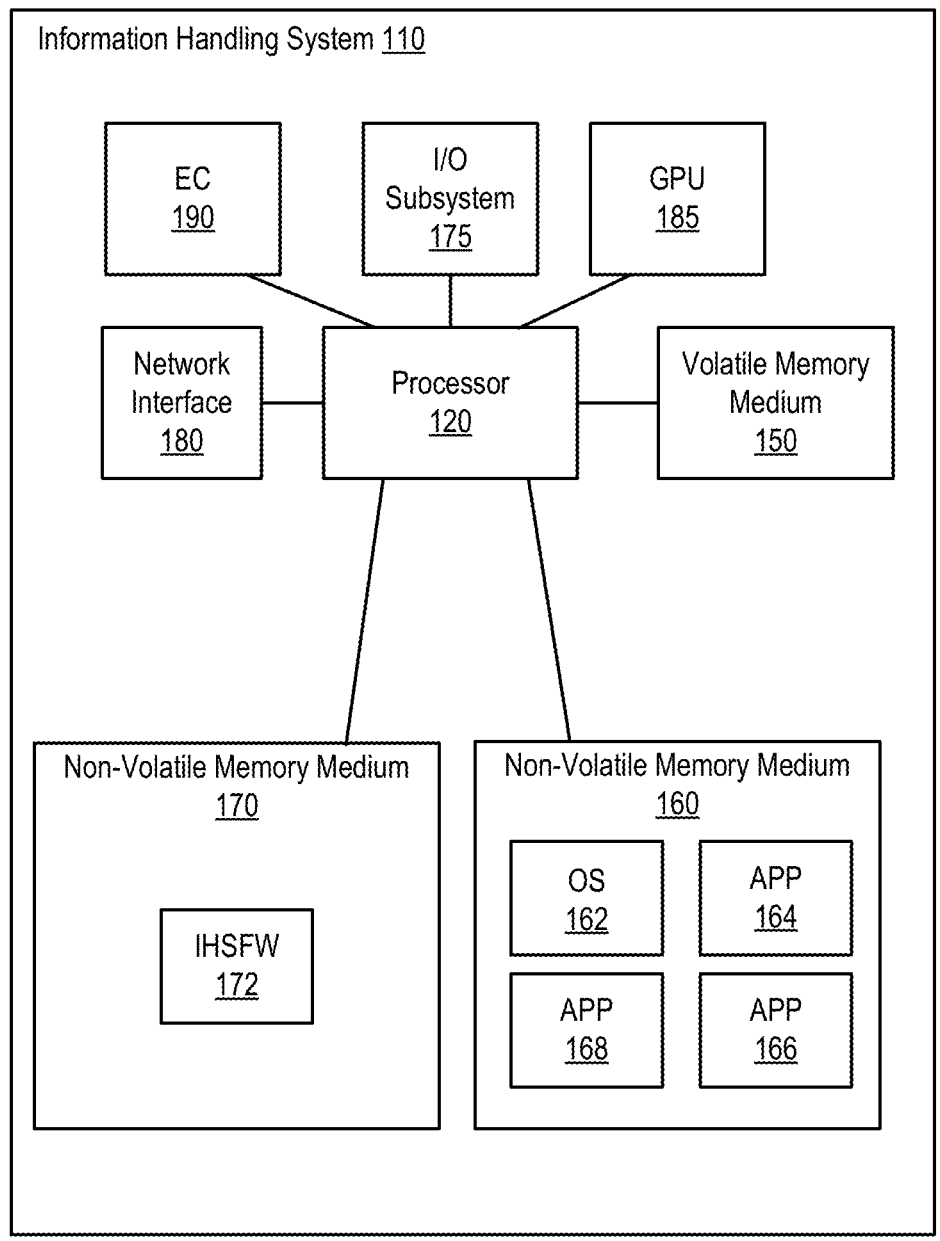
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, processors of information handling systems may utilize dynamic power. For example, the processors of information handling systems may utilize variable clock speeds to increase or decrease information processing speeds. For instance, if a processor utilizes a higher clock speed to process information more quickly, the processor may produce more energy in a form of heat. In one or more embodiments, when more energy in the form of heat is produced, one or more fans, of an information handling system, may increase speeds. For example, increasing a speed of a fan may produce more sound. For instance, the sound may be or include noise. In one or more embodiments, it may be advantageous for an information handling system to produce little or no noise when processing information. For example, a user of the information handling system may have a better user experience if the information handling system produced little or no noise when processing information. In one or more embodiments, utilizing airflow without a fan may be utilized in cooling one or more components of an information handling system. For example, utilizing airflow without a fan may be utilized in cooling one or more components of an information handling system may provide for an information handling system that produces little to no noise when processing information.

In one or more embodiments, one or more arrangements of components of an information handling system may be utilized to create airflow in the information handling system. For example, the airflow may draw heat from one or more of the components. For instance, convective cooling may be utilized in producing the airflow that may draw heat from the one or more of the components. In one or more embodiments, convective cooling in an information handling system may be based at least on a thermal resistance of a component and/or based at least on a temperature of air flowing over the component. In one or more embodiments, components of an information handling system may be arranged based at least on one or more of an average temperature of each of the components, a thermal resistance of each of the components, power consumption of each of the components, and an airflow over the components, among others.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, a graphics processor unit (GPU) 185, and an embedded controller (EC) 190. As illustrated, volatile memory medium 150, non-volatile memory media 160 and 170, I/O subsystem 175, network interface 180, GPU 185, and EC 190 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, EC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

In one or more embodiments, processor 120 and one or more components of IHS 110 may be included in a system-on-chip (SoC). For example, the SoC may include processor 120 and a platform controller hub (not specifically illustrated).

Figure 2:
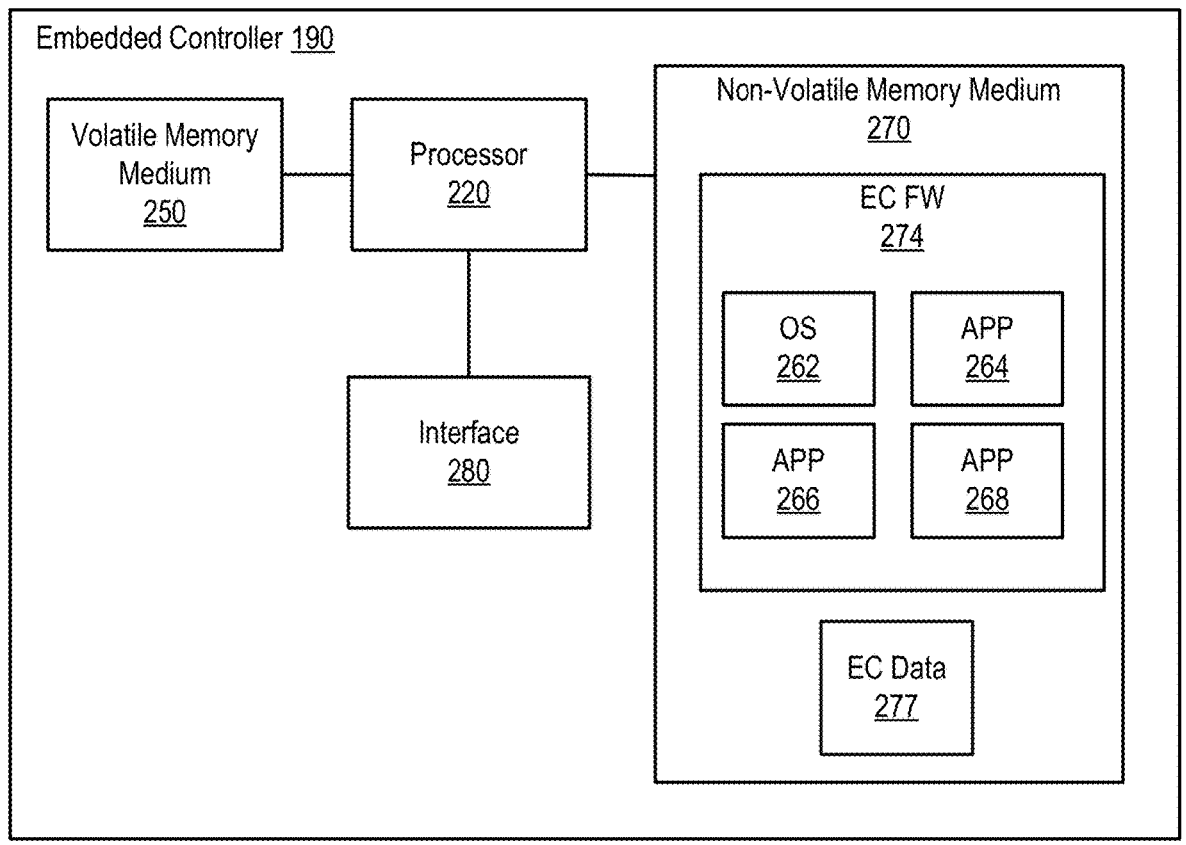
FIG. 2 illustrates an example embedded controller, according to one or more embodiments.

Turning now to FIG. 2, an example embedded controller is illustrated, according to one or more embodiments. As shown, EC 190 may include a processor 220, a volatile memory medium 250, a non-volatile memory medium 270, and an interface 280. As illustrated, non-volatile memory medium 274 may include an EC FW 274, which may include an OS 262 and APPs 264-268, and may include EC data 277. For example, OS 262 may be or include a real-time operating system (RTOS).

In one or more embodiments, interface 280 may include circuitry that enables communicatively coupling to one or more devices. In one example, interface 280 may include circuitry that enables communicatively coupling to one or more buses. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 190 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Figure 3A:
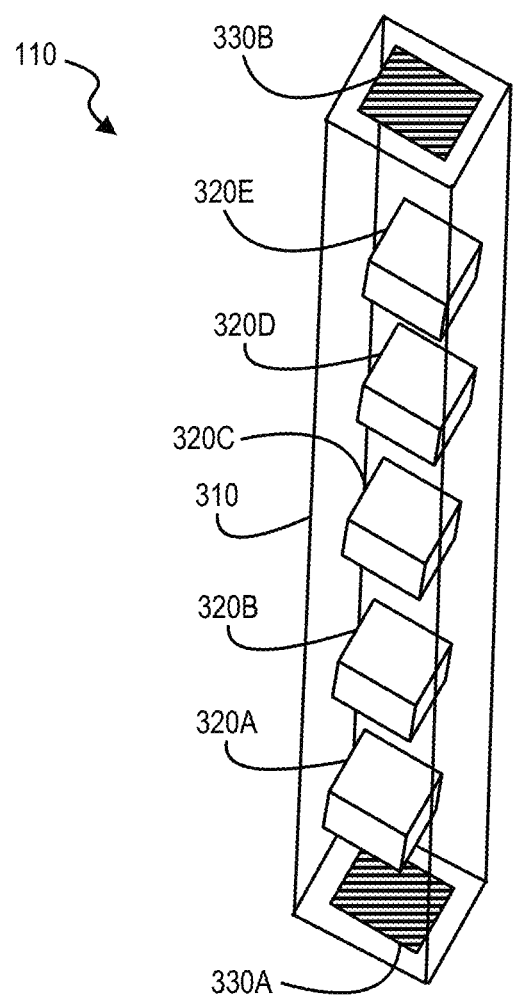
FIGS. 3A and 3B illustrate examples of an information handling system that includes a duct, according to one or more embodiments.

Turning now to FIG. 3A, an example of an information handling system that includes a duct is illustrated, according to one or more embodiments. As shown, IHS 110 may include a duct 310. In one or more embodiments, duct 310 may be or include a housing that permits air to flow from a first end of duct 310 to a second end of duct 310. As illustrated, components 320A-320E of IHS 110 may be arranged within duct 310. In one or more embodiments, a component 320 may be an element of IHS 110. As shown, duct 310 may have a vent 330A at a first end of duct 310, and duct 310 may have a vent 330B at a second end of duct 310. In one or more embodiments, heat from one or more of components 320A-320E produce a convention air current. In one example, heat from one or more of components 320A-320E may draw air into vent 330A. In another example, air may be exit duct 310 via vent 330B. Although duct 310 is illustrated with a shape of a rectangular prism or a cuboid, duct 310 may be of any applicable shape. In one example, duct 310 may include a shape of a polygonal prism. In another example, duct 310 may include a shape of a cylinder. In one or more embodiments, IHS 110 may be without a fan. For example, convective cooling may be utilized in producing airflow that may draw heat from the one or more of the components. For instance, air may flow in via vent 330A, may flow across components 320A-320E, and may flow out via vent 330B. In one or more embodiments, air flowing in this fashion may convective cool one or more of components 320A-320E, among others.

Figure 3B:
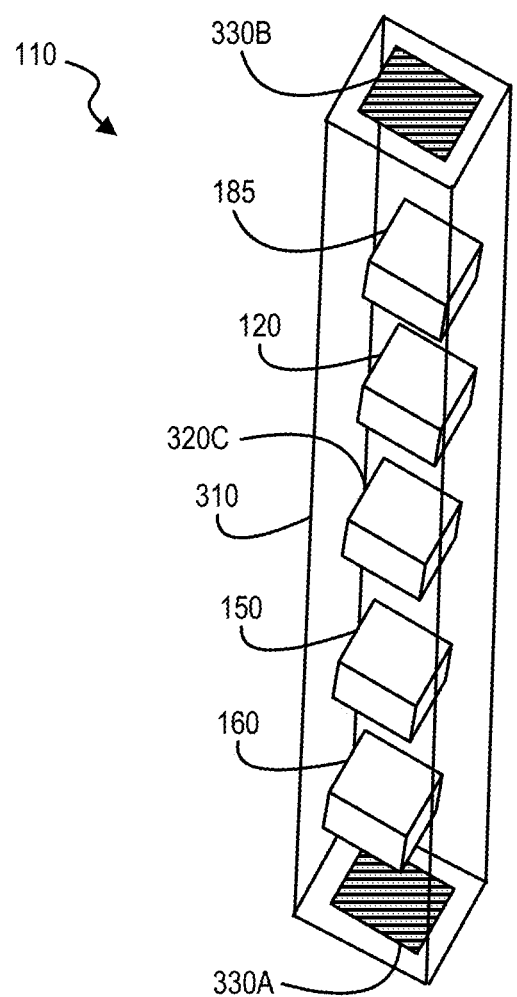

Turning now to FIG. 3B, another example of an information handling system that includes a duct is illustrated, according to one or more embodiments. As shown, elements of IHS 110 may be arranged within duct 310. In one or more embodiments, component 320C may be or include a power supply unit.

Figure 3C:
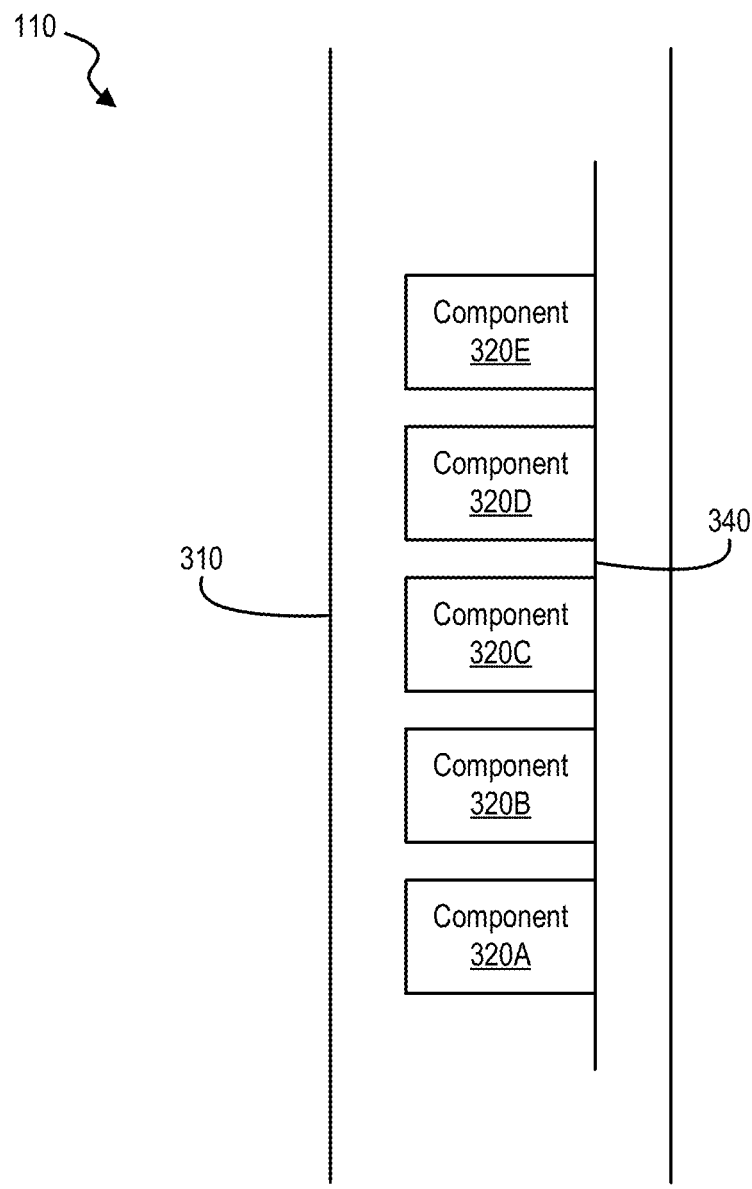
FIG. 3C illustrates an example of components arranged on a board of a duct, according to one or more embodiments.

Turning now to FIG. 3C, an example of components arranged on a board of a duct is illustrated, according to one or more embodiments. As shown, components 320A-320E may be coupled to a board 340. As illustrated, duct 310 may include board 340. In one or more embodiments, board 340 may arrange components 320A-320E within duct 310. In one or more embodiments, board 340 may be or include a printed circuit board (PCB). In one or more embodiments, board 340 may be or include a motherboard. In one or more embodiments, board 340 may electrically and/or communicatively couple two or more components 320 to one-another.

Figure 3D:
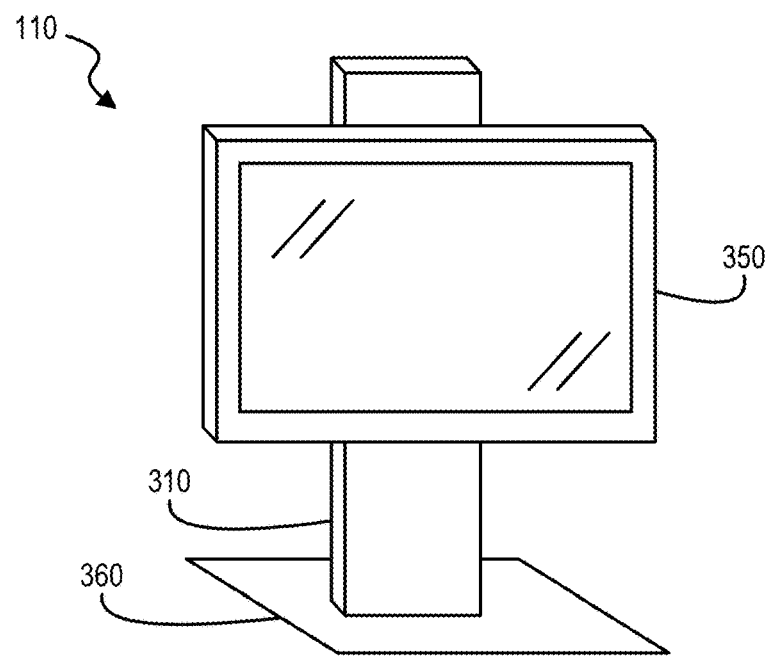
FIGS. 3D and 3E illustrate an example of an information handling system that includes a display, according to one or more embodiments.
Figure 3E:
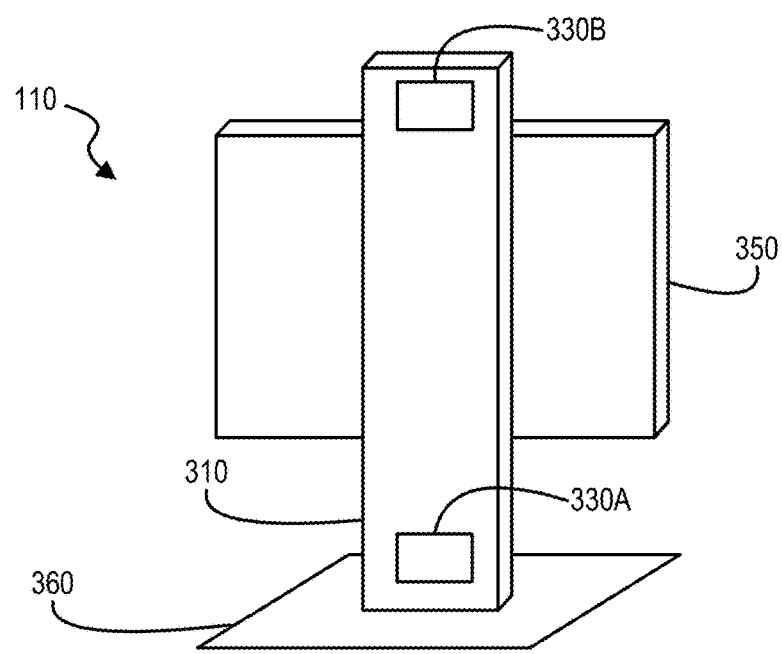
Figure 4A:
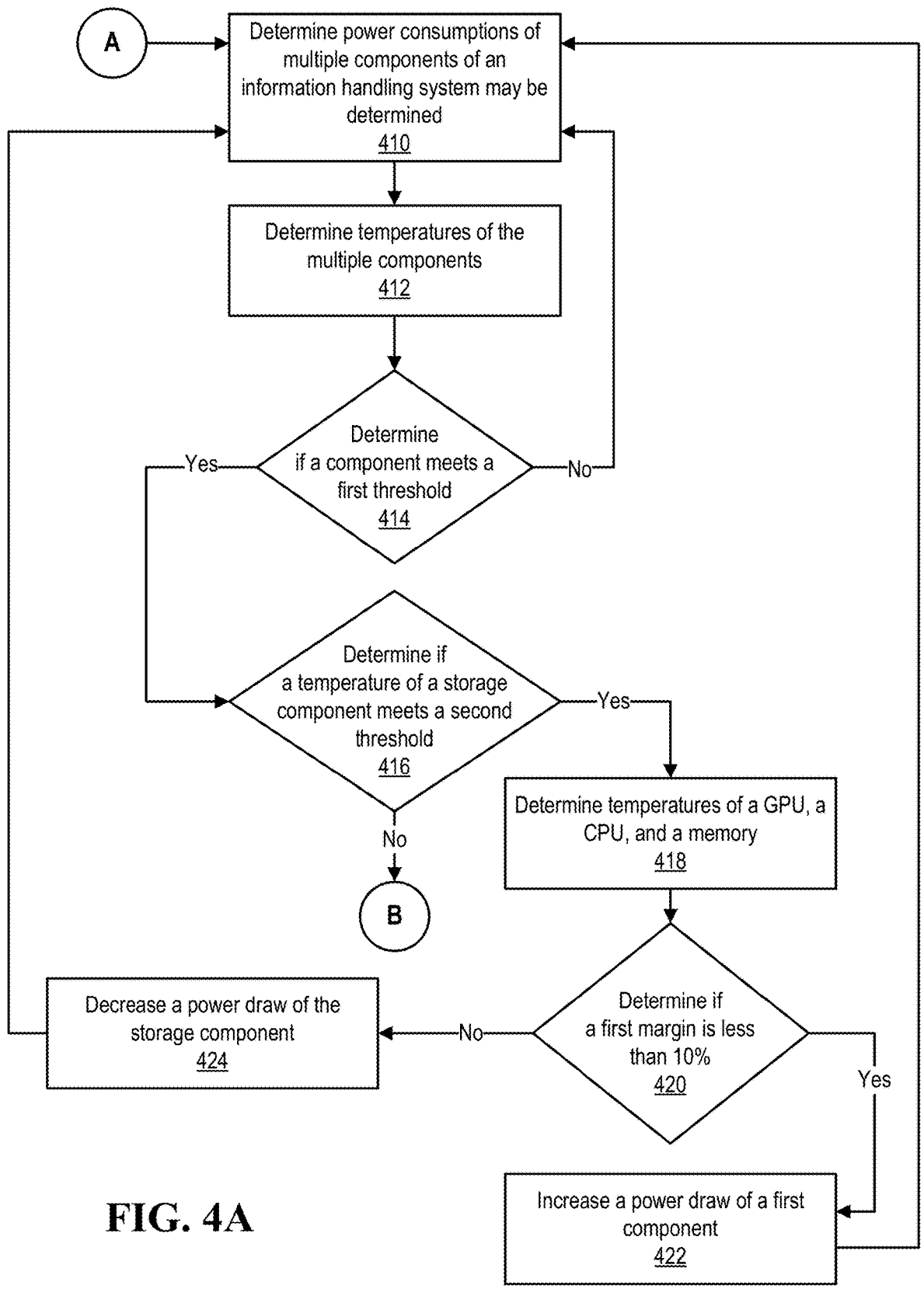
FIGS. 4A-4D illustrate an example of a method of transferring energy in an information handling system, according to one or more embodiments.
Figure 4B:
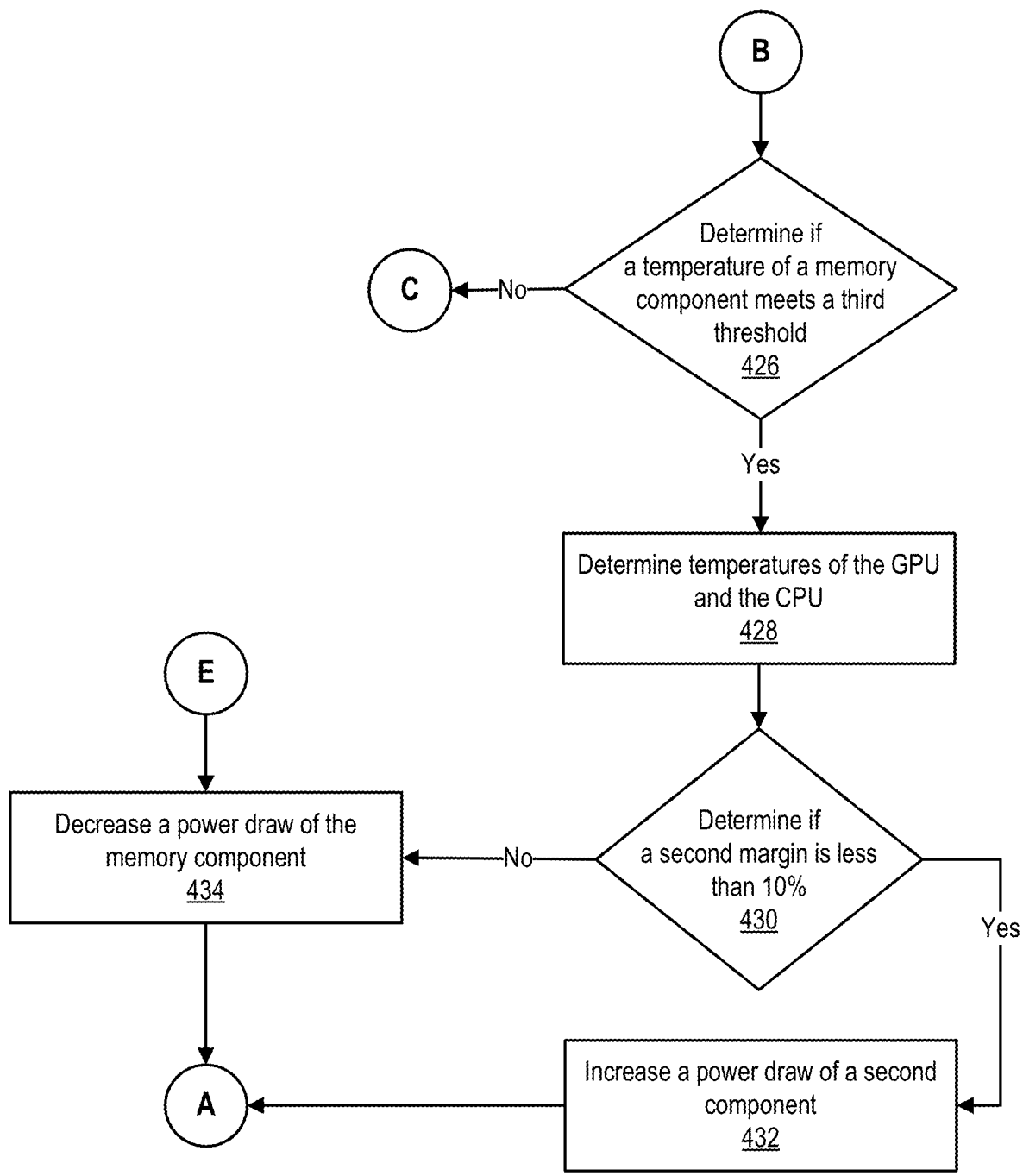
Figure 4C:
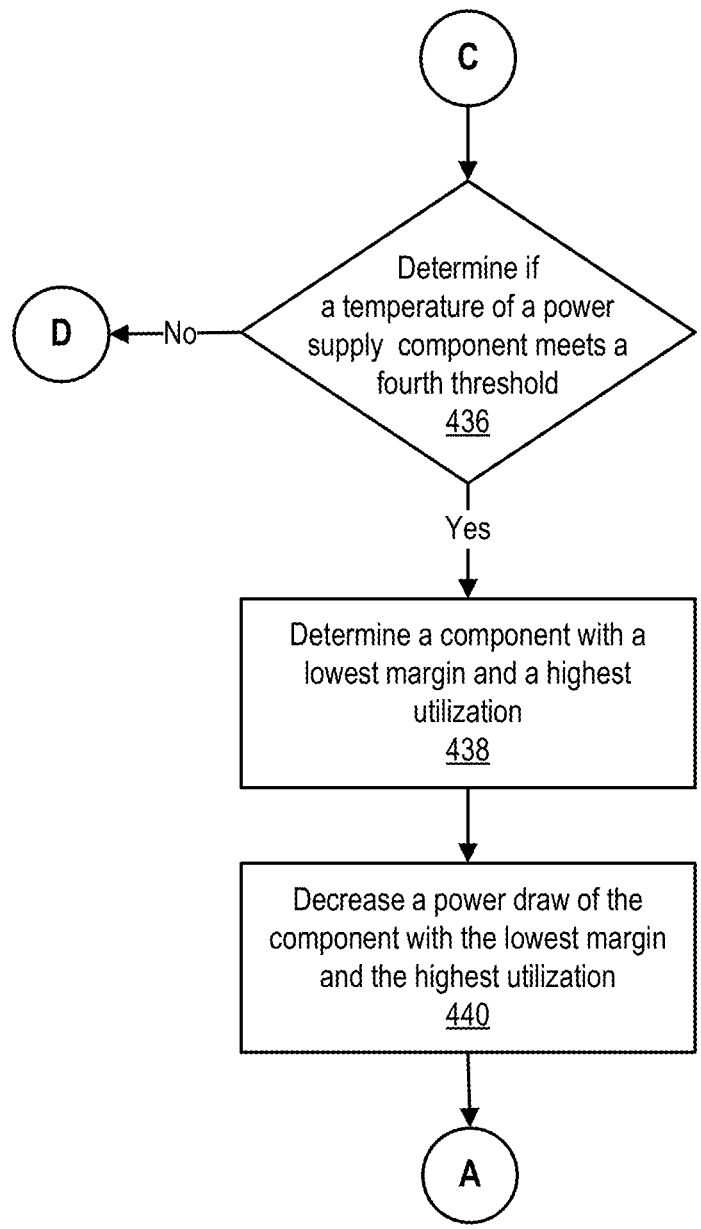
Figure 4D:
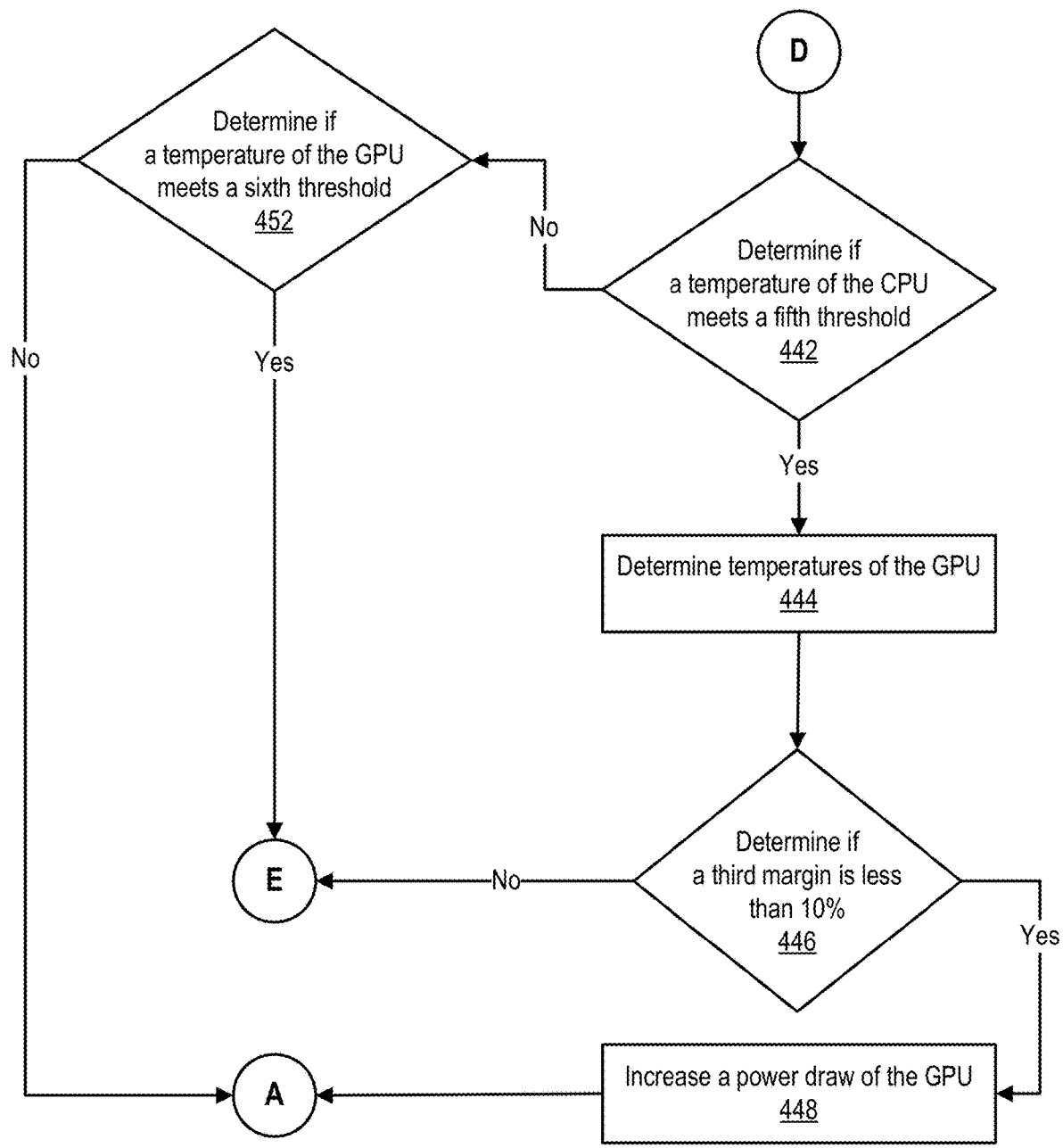

Turning now to FIGS. 3D and 3E, an example of an information handling system that includes a display is illustrated, according to one or more embodiments. As shown, IHS 110 may include a display 350. In one or more embodiments, IHS 110 may be a desktop "all-in-one" information handling system. As illustrated, duct 310 may be coupled to display 350 and a base 360. As shown in FIG. 3E, duct 310 may have vents 330A and 330B near ends of duct 310 to accommodate one or more configurations of IHS 110. For example, duct 310 may have vent 330A near an end of duct 310 to accommodate base 360. For instance, duct 310 may have vent 330A on a side of duct 310, near an end of duct 310 to accommodate base 360.

Turning now to FIGS. 4A-4D, an example of a method of transferring energy in an information handling system is illustrated, according to one or more embodiments. At 410, power consumptions of multiple components of an information handling system may be determined. For example, power consumptions of components 320A-320E may be determined. For instance, components 320A-320E may be or include non-volatile memory medium 160, volatile memory medium 150, power supply 320C, processor 110 (e.g., a CPU), and GPU 185, respectively. At 412, temperatures of the multiple components may be determined. In one or more embodiments, circuitry may determine a temperature of component 320. In one example, component 320 may include the circuitry that may determine a temperature of component 320. In another example, circuitry proximate to component 320 may determine a temperature of component 320. For instance, the circuitry proximate to component 320 may be on board 340.

At 414, it may be determined if a component meets a first threshold. For example, it may be determined if a temperature of one of components 320A-320E meets a first temperature threshold. In one or more embodiments, meeting a threshold may include exceeding the threshold. If the temperature of the component does not meet the first threshold, the method may proceed to 410, according to one or more embodiments. If the temperature of the component meets the first threshold, it may be determined if a temperature of a storage component meets a second threshold, at 416. For example, it may be determined if a temperature of component 320A meets a second threshold. For instance, it may be determined if a temperature of non-volatile memory medium 160 meets a second threshold.

If the temperature of the storage component meets the second threshold, temperatures of a GPU, a CPU, and a memory may be determined, at 418. For example, temperatures of GPU 185, processor 120, and volatile memory medium 150 may be determined. At 420, it may be determined if a first margin is less than 10%. In one or more embodiments, a margin may be a difference between a maximum temperature of a component and an ambient temperature. For example, the ambient temper may be a temperature inside duct 310.

In one or more embodiments, determining if a margin is less than 10% may include determining:

$$T_{component} < T_{max} - ((T_{max} - T_{ambient}) \cdot 0.1),$$

where $T_{component}$ is a current temperature of the component, $T_{max}$ is a maximum specified temperature of the component, and $T_{ambient}$ is an ambient temperature. In one example, a maximum specified temperature for component 320D may be 100° C., an ambient temperature may be 35° C., and a first margin may be 65° C. For instance, if a current temperature of component 320D is below 100° C.−0.1·(100° C.−35° C.), then the current temperature of component 320D may be increased. In a second example, a maximum specified temperature for component 320E may be 92° C., an ambient temperature may be 38° C., and a first margin may be 54° C. For instance, if a current temperature of component 320E is below 92° C.−0.1·(92° C.−38° C.), then the current temperature of component 320E may be increased. In another example, a maximum specified temperature for component 320B may be 60° C., an ambient temperature may be 39° C., and a first margin may be 21° C. For instance, if a current temperature of component 320B is below 60° C.−0.1·(60° C.−39° C.), then the current temperature of component 320B may be increased.

If the first margin not is less than 10%, a power draw of the storage component may be decreased, at 424. In one or more embodiments, decreasing a power draw of the storage component may include reducing a number of operations per time unit. For example, decreasing a power draw of the storage component may include one or more of reducing a number of read operations per second and reducing a number of write operations per second, among others.

If the first margin is less than 10%, a power draw of a first component may be increased, at 422. In one or more embodiments, increasing a power draw of a component may include one or more of increasing processing of the component and increasing data input and/or output of the component, among others. In one example, increasing a power draw of a component may include increasing a temperature of the component. In another example, increasing a power draw of a component may include one or more of increasing processing of the component and increasing data input and/or output of the component, among others. In one or more embodiments, increasing a power draw of the first component may include increasing a power draw of component 320B, component 320D, or component 320E. For example, increasing a power draw of the first component may include increasing a power draw of volatile memory 150, processor 120, or GPU 185.

If a temperature of the storage component does not meet the second threshold, it may be determined if a temperature of a memory component meets a third threshold, at 426. For example, it may be determined if a temperature of component 320B meets a third threshold. For instance, it may be determined if a temperature of volatile memory medium 150 meets a third threshold. If the temperature of the memory component meets the third threshold, temperatures of a GPU and a CPU, at 428. For example, temperatures of GPU 185 and processor 120 may be determined.

At 430, it may be determined if a second margin is less than 10%. If the second margin not is less than 10%, a power draw of the memory component may be decreased, at 434. In one or more embodiments, decreasing a power draw of the memory component may include reducing a number of operations per time unit. For example, decreasing a power draw of the memory component may include one or more of reducing a number of read operations per second and reducing a number of write operations per second, among others. In one or more embodiments, decreasing a power draw of a component may cause a temperature associated with the component to decrease. For example, decreasing a power draw of the memory component may cause a temperature associated with the memory component to decrease. In one or more embodiments, information may be provided to a component that decreases a power draw of the component. For example, providing the information that decreases the power draw of the component may cause a temperature of the component to decrease.

If the second margin is less than 10%, a power draw of a second component may be increased, at 432. In one or more embodiments, increasing a power draw of a component may include one or more of increasing processing of the component and increasing data input and/or output of the component, among others. In one example, increasing a power draw of a component may include increasing a temperature of the component. In another example, increasing a power draw of a component may include one or more of increasing processing of the component and increasing data input and/or output of the component, among others. In one or more embodiments, increasing a power draw of the second component may include increasing a power draw of component 320D or component 320E. For example, increasing a power draw of the second component may include increasing a power draw of processor 120 or GPU 185.

If the temperature of the memory does not meet the third threshold, it may be determined if a power supply component meets a fourth threshold, at 436. If the power supply component meets the fourth threshold, a component with a lowest margin and a highest utilization may be determined, at 438. For example, a component with a lowest margin and a highest utilization may be component 320D or component 320E. At 440, power draw of the component with the lowest margin and the highest utilization may be decreased. If the power supply component does not meet the fourth threshold, it may be determined if a temperature of the CPU meets a fifth threshold, at 442. If the temperature of the CPU meets the fifth threshold, a temperature of the GPU may be determined, at 444. At 446, it may be determined if a third margin is less than 10%. If the third margin is less than 10%, a power draw to the GPU may be increased, at 448. If the third margin is not less than 10%, a power draw of the memory component may be decreased at 434. If a temperature of the CPU does not a fifth threshold, it may be determined if a temperature of the GPU meets a sixth threshold, at 452. If the temperature of the GPU does not meet the sixth threshold, the method may proceed to 410, according to one or more embodiments. If the temperature of the GPU does meets the sixth threshold, a power draw of the memory component may be decreased at 434. In one or more embodiments, two or more of the first threshold, the second threshold, the third threshold, the fourth threshold, the fifth threshold, and the sixth threshold may be equal.

Figure 5:
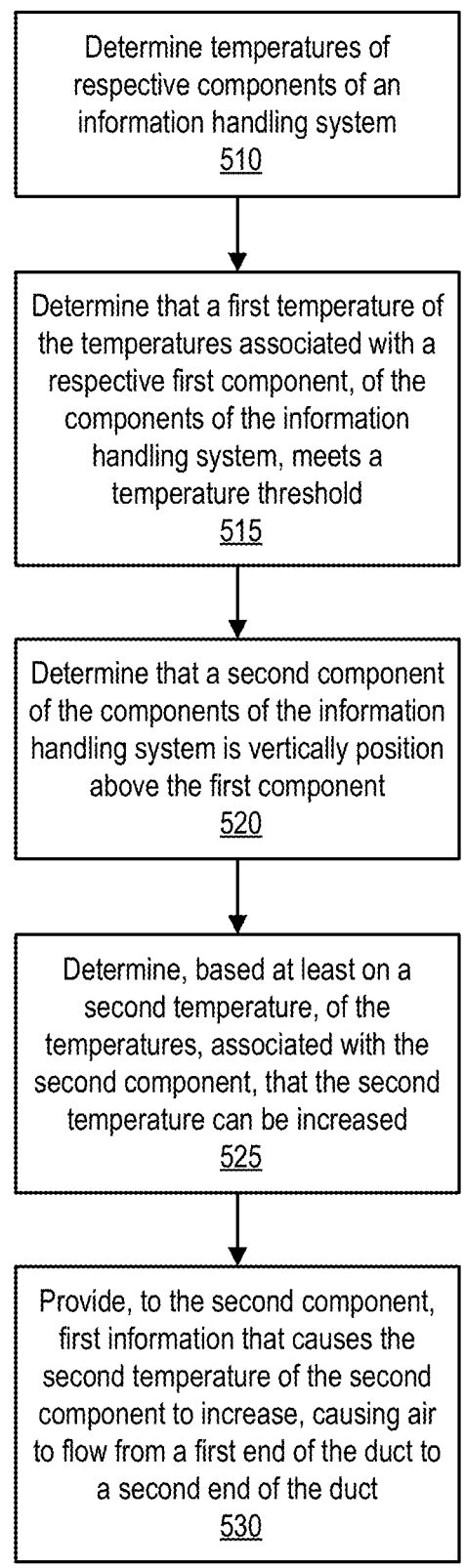
FIG. 5 illustrates an example of a method of operating an information handling system, according to one or more embodiments.

Turning now to FIG. 5, an example of a method of operating an information handling system is illustrated, according to one or more embodiments. At 510, temperatures of respective components, of the information handling system, may be determined. For example, temperatures of components 320A-320E may be determined. In one instance, EC 190 may determine temperatures of components 320A-320E. In another instance, a device driver (e.g., a device driver of OS 162) may determine temperatures of components 320A-320E. In one or more embodiments, a component 320 may include a temperature measurement device that may determine a temperature of component 320.

For example, determining temperatures of respective components may include receiving temperatures from components 320A-320E.

At 515, it may be determined that a first temperature, of the temperatures, associated with a respective first component of the components meets a temperature threshold. In one example, EC 190 may determine that a first temperature, of the temperatures, associated with a respective first component of the components meets a temperature threshold. In another example, a device driver (e.g., a device driver of OS 162) may determine that a first temperature, of the temperatures, associated with a respective first component of the components meets a temperature threshold. In one or more embodiments, the temperature threshold may be configured in a memory medium. In one example, the temperature threshold may be configured in one or more of memory media 150-170, among others. In another example, the temperature threshold may be configured in one or more of memory media 240 and 270, among others. For instance, the temperature threshold may be configured in EC data 277. In one or more embodiments, determining that first temperature meets the temperature threshold may include comparing the first temperature and the temperature threshold. For example, determining that first temperature meets the temperature threshold may include comparing the first temperature and the temperature threshold, which may determine that the first temperature is equal to or greater than the temperature threshold.

At 520, it may be determined that a second component of the components of the information handling system is vertically positioned above the first component. In one or more embodiments, determining that a second component of the components of the information handling system is vertically positioned above the first component may include accessing a memory medium that stores physical special configuration information that may be utilized in determined if the second component is vertically positioned above the first component. In one or more embodiments, determining that a second component of the components of the information handling system is vertically positioned above the first component may include accessing configuration information. For example, the configuration information may be stored via a memory medium.

At 525, it may be determined, based at least on a second temperature of the temperatures, associated with the second component, that the second temperature associated with the second component can be increased. In one or more embodiments, determining that the second temperature associated with the second component can be increased may include determining a margin, associated with the second component, is less than 10% second temperature of the. For example, determining that the second temperature associated with the second component can be increased may include determining that $$T_{Second\ Component} < T_{max} - ((T_{max} - T_{ambient}) \cdot 0.1),$$

where $T_{Second\ Component}$ is a current temperature of the second component, $T_{max}$ is a maximum specified temperature of the second component, and $T_{ambient}$ is an ambient temperature. For instance, the ambient temperature may be a temperature inside duct 310.

At 530, information that causes the second temperature of the second component to increase may be provided to the second component, which may cause air to flow from a first end of the duct to a second end of the duct. In one or more embodiments, causing the second temperature of the second component to increase, which may cause air to flow from the first end of the duct to the second end of the duct, may be additive. For example, air may be already flowing from the first end of the duct to the second end of the duct, and causing the second temperature of the second component to increase may cause additional airflow from the first end of the duct to the second end of the duct.

In one or more embodiments, the information that causes the second temperature of the second component to increase may be or include a synthetic workload. In one example, the second component may be or include processor 120. For instance, the synthetic workload may be or include instructions executable by processor 120. In a second example, the second component may be or include GPU 185. For instance, the synthetic workload may be or include instructions executable by GPU 185. In another example, the second component may be or include volatile memory medium 150. For instance, the synthetic workload may be or include data for volatile memory medium 150 to store and/or retrieve. In one or more embodiments, the information that causes the second temperature of the second component to increase may be or include a non-synthetic workload. In one example, the non-synthetic workload may be or include a workload associated with grid computing. For instance, the workload associated with grid computing may be or include a workload associated with Berkeley Open Infrastructure for Network Computing (BOINC), which may support one or more of a SETI@home project, medical research, climatology research, molecular biology research, astrophysics research, and environmental science research, among others. In another example, the non-synthetic workload may be or include a workload associated a public ledger (e.g., a blockchain).

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a duct;
   a plurality of components;
   wherein the plurality of components includes at least one
      processor, a memory medium that is coupled to the at
      least one processor, and a power supply unit that is configured to supply power to each of the plurality of components other than the power supply;

wherein the duct houses the plurality of components, which are vertically positioned within the duct;

wherein the memory medium includes instructions, when executed by the at least one processor, cause the information handling system to:

determine a respective plurality of temperatures of the plurality of components;

determine that a first temperature of the plurality of temperatures associated with a respective first component of the plurality of components meets a temperature threshold;

determine that a second component of the plurality of components is vertically positioned above the first component;

determine, based at least on a second temperature of the plurality of temperatures, associated with the second component, that the second temperature associated with the second component can be increased; and provide, to the second component, first information that causes the second temperature of the second component to increase, causing air to flow from a first end of the duct to a second end of the duct.

2. The information handling system of claim 1, wherein the duct has a first vent at or near the first end of the duct and a second vent at or near the second end of the duct.

3. The information handling system of claim 1, wherein the second component includes a graphical processing unit; and wherein the first information that causes the second temperature of the second component to increase includes graphical processing unit instructions that are executable the graphical processing unit.

4. The information handling system of claim 1, further comprising:

a display that is coupled to the duct.

5. The information handling system of claim 1, wherein the instructions further cause the information handling system to:

provide second information to the first component that causes the first temperature of the first component to decrease.

6. The information handling system of claim 1, further comprising:

a board;

wherein the plurality of components are coupled to the board; and wherein the board vertically positions the plurality of components within the duct and communicatively couples at least two of the plurality of components.

7. The information handling system of claim 1, wherein the duct includes a shape of a rectangular prism, a polygonal prism, or a cylinder.

8. A method of operating an information handling system, comprising:

determining a plurality of temperatures of a respective plurality of components, of the information handling system, housed in a duct of the information handling system and vertically positioned within the duct;

determining that a first temperature of the plurality of temperatures associated with a respective first component of the plurality of components meets a temperature threshold;

determining that a second component of the plurality of components is vertically positioned above the first component;

determining, based at least on a second temperature of the plurality of temperatures, associated with the second component, that the second temperature associated with the second component can be increased; and providing, to the second component, first information that causes the second temperature of the second component to increase, causing air to flow from a first end of the duct to a second end of the duct.

9. The method of claim 8, wherein the duct has a first vent at or near the first end of the duct and a second vent at or near the second end of the duct.

10. The method of claim 8, wherein the second component includes a graphical processing unit; and wherein the first information that causes the second temperature of the second component to increase includes graphical processing unit instructions that are executable the graphical processing unit.

11. The method of claim 8, wherein the information handling system includes a display that is coupled to the duct.

12. The method of claim 8, further comprising:

providing second information to the first component that causes the first temperature of the first component to decrease.

13. The method of claim 8, wherein the plurality of components are coupled to a board, of the information handling system, that vertically positions the plurality of components within the duct and communicatively couples at least two of the plurality of components.

14. The method of claim 8, wherein the duct includes a shape of a rectangular prism, a polygonal prism, or a cylinder.

15. A computer-readable non-transitory memory medium that includes processor instructions that, when executed by at least one processor of an information handling system, cause the information handling system to:

determine a plurality of temperatures of a respective plurality of components, of the information handling system, housed in a duct of the information handling system and vertically positioned within the duct;

determine that a first temperature of the plurality of temperatures associated with a respective first component of the plurality of components meets a temperature threshold;

determine that a second component of the plurality of components is vertically positioned above the first component;

determine, based at least on a second temperature of the plurality of temperatures, associated with the second component, that the second temperature associated with the second component can be increased; and provide, to the second component, first information that causes the second temperature of the second component to increase, causing air to flow from a first end of the duct to a second end of the duct.

16. The computer-readable non-transitory memory medium of claim 15, wherein the duct has a first vent at or near the first end of the duct and a second vent at or near the second end of the duct.

17. The computer-readable non-transitory memory medium of claim 15, wherein the second component includes a graphical processing unit; and wherein the first information that causes the second temperature of the second component to increase includes graphical processing unit instructions that are executable the graphical processing unit.

18. The computer-readable non-transitory memory medium of claim 15, wherein the information handling system includes a display that is coupled to the duct.

19. The computer-readable non-transitory memory medium of claim 15, wherein the processor instructions further cause the information handling system to:
provide second information to the first component that causes the first temperature of the first component to decrease.

20. The computer-readable non-transitory memory medium of claim 15, wherein the plurality of components are coupled to a board, of the information handling system, that vertically positions the plurality of components within the duct and communicatively couples at least two of the plurality of components.

* * * * *